UNITED STATES PATENT OFFICE.

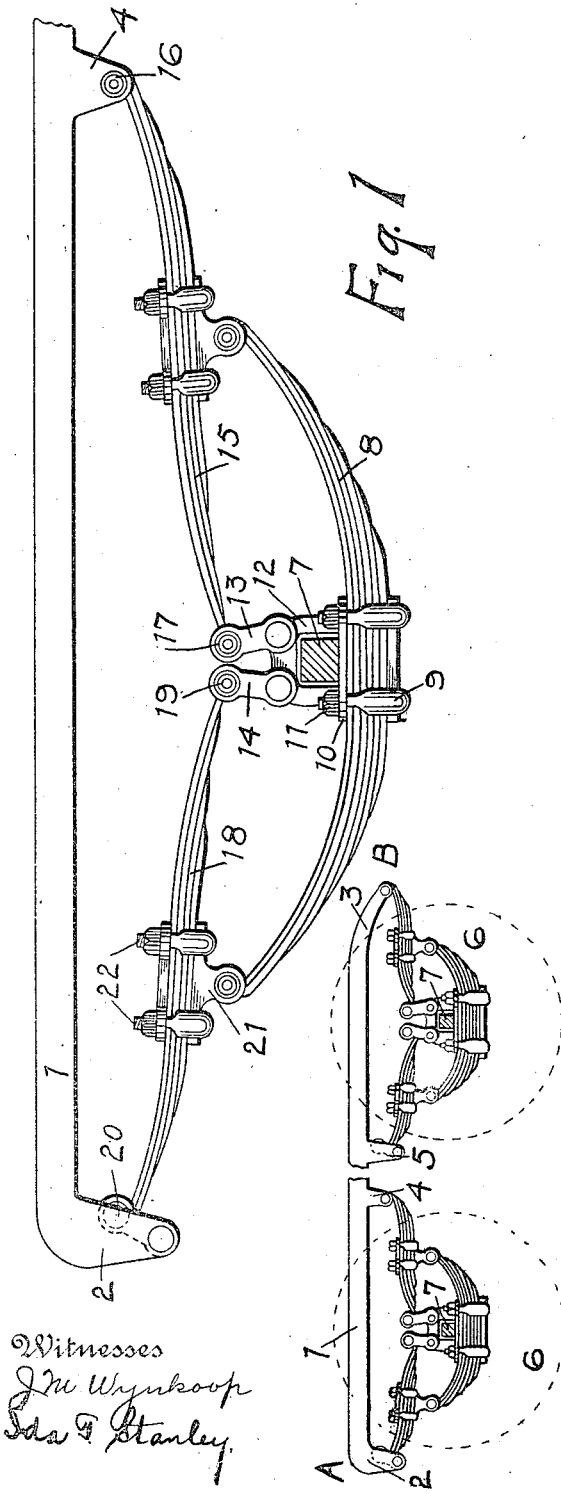

JOHN A. McANULTY, OF INDIANAPOLIS, INDIANA.

SPRING FOR VEHICLES.

1,060,778.

Specification of Letters Patent.    Patented May 6, 1913.

Application filed July 27, 1911. Serial No. 640,801.

*To all whom it may concern:*

Be it known that I, JOHN A. McANULTY, a citizen of the United States, now residing at Indianapolis, in the county of Marion and State of Indiana, have invented certain new and useful Improvements in Springs for Vehicles, of which the following is a specification.

The object of my invention is to increase the vertical range of movement of the axle to a greater degree or beyond the combined compression of the springs. This object is obtained through the medium of a spring having levers fulcrumed to its ends in such a way as to double or treble the range of vertical movement of the axle over the compression of the springs.

In the drawing:—Figure 1 is a side elevation of a vehicle with my spring applied, and Fig. 2 is a side elevation of a chassis, parts being broken away with the wheels shown in dotted outline.

A represents the front of the vehicle and B the rear.

1 represents the body of the vehicle having turned down portions 2 and 3 at the front and rear ends.

4 and 5 are depending brackets or arms, the bracket 5 being longer than the bracket 4.

6 is the wheel of the vehicle indicated in dotted lines and 7 the axle, which may be of any approved construction.

The axle spring 8 is secured to the axle by means of the clips 9 and 10, the clips 9 being secured to the clip 10 by means of the nuts 11. The clip 10 is provided with a yoke 12 surrounding the axle 7, said yoke being provided with shackles 13 and 14 which are hinged thereto.

15 is a spring which is shown in Fig. 1 as a bow spring, the front end of which is connected to the body of the vehicle by means of the arm 4 with which it has a hinge joint 16. The rear end of the spring 15 is connected by means of the hinge joint 17 to the shackle 13.

18 is a spring member similar to 15, the forward end of which is connected by means of the hinge joint 19 to the shackle 14, while its rearward end is connected by a hinge joint to the shackle 20, which in turn is swung on the depending portion 3 of the body. In this connection, it will be noted that this spring 18 is hung upon shackles at each end, whereby it is enabled to move axially bodily relative to the axle and the body of the vehicle, while the spring 15 is held against axial bodily movement by reason of its hinge connection with the arm 4.

The axle spring is secured at its ends to the springs 18 and 15 respectively, by means of the clip 21 which is fixedly secured to the springs 15 and 18 by means of the bolts 22.

In the leverage system of the springs, the ends of the axle spring serve as fulcrums for the springs 15 and 18, so that when the hinges 21 are central of the springs 15 and 18 the vertical range of movement of the axle is double the combined compression of the axle spring and the springs.

It will be understood that if the hinges 21 are mounted on the springs 15 and 18 nearer their inner ends than their outer ends the vertical range of the axle will be greater than double the combined compression of the spring 8 and that of 15 and 18 collectively.

If hinged farther from the axle than their centers the range of axle will be less than double the compression of the springs.

With the hinges central they double the spring compression. One third out from the axle they would vibrate three inches to one inch in spring compression.

I claim:—

1. In a vehicle, the combination with the body and axle, of a bow spring, one end of which is hinged to the body and its other end connected to the axle by a shackle, a second spring, a shackle connecting one end thereof to the body, and a shackle connecting the other end to the axle, and a third bow spring connected to the axle with its ends hinged to an intermediate point on the first and second springs.

2. In a vehicle, the combination with the body and axle, of a spring secured to the axle and extending rearwardly therefrom with its rear end secured to the body against bodily axial movement, a spring extending forwardly from the axle, and shackles connecting its ends to the axle and body respectively and permitting said spring to move bodily axially independently of a relative movement of the body of the vehicle, and an axle spring secured to the axle at its center with its ends hinged at an intermediate point to the other springs, whereby the temporary stoppage of the wheel of the vehicle due to an obstruction will be taken up by compression on the rearwardly extending spring and by the bodily axial movement of the forwardly extending spring permitted by the shackles.

3. In a vehicle, the combination with the body and the axle, of a central bow spring secured midway of its length transverse to the axle, a bow spring hinged on one end of the central bow, one end of which is secured to the body by a shackle, a shackle securing the other end of said spring to the axle, and a third bow spring hinged at its center to the other end of the central bow, one end of which is hinged to the vehicle body and a shackle securing the other end of the third bow spring to the axle.

The foregoing specification signed at Indianapolis, Indiana, this 24th day of June, 1911.

JOHN A. McANULTY.

In presence of two witnesses—
J. N. BROMERT,
CHAS. B. McFADDEN.